United States Patent
Hamm et al.

(10) Patent No.: US 8,047,068 B2
(45) Date of Patent: Nov. 1, 2011

(54) SNAP-IN TIRE VALVE

(75) Inventors: Lawrence W. Hamm, Royal Oak, MI (US); Michael A. Uleski, Roseville, MI (US)

(73) Assignee: Schrader Electronics, Inc., Auburn Hills, MI (US)

( * ) Notice: Subject to any disclaimer, the term of this patent is extended or adjusted under 35 U.S.C. 154(b) by 345 days.

(21) Appl. No.: 12/184,389

(22) Filed: Aug. 1, 2008

(65) Prior Publication Data
US 2010/0024539 A1 Feb. 4, 2010

(51) Int. Cl.
*B60C 23/02* (2006.01)
(52) U.S. Cl. ........................................ 73/146.5
(58) Field of Classification Search ............... None
See application file for complete search history.

(56) References Cited

U.S. PATENT DOCUMENTS

| | | | | |
|---|---|---|---|---|
| 6,005,480 A * | 12/1999 | Banzhof et al. | | 340/447 |
| 6,163,255 A * | 12/2000 | Banzhof et al. | | 340/447 |
| 6,568,259 B2 * | 5/2003 | Saheki et al. | | 73/146 |
| 7,017,403 B2 * | 3/2006 | Normann et al. | | 73/146.2 |
| 7,107,830 B1 * | 9/2006 | Yu et al. | | 73/146.4 |
| 7,145,443 B2 * | 12/2006 | Ito et al. | | 340/442 |
| 7,395,702 B2 * | 7/2008 | Qiu et al. | | 73/146.8 |
| 7,469,581 B2 * | 12/2008 | Katou et al. | | 73/146.8 |
| 7,516,653 B2 * | 4/2009 | Blossfeld | | 73/146.8 |
| 7,568,386 B2 * | 8/2009 | Blossfeld | | 73/146.8 |

* cited by examiner

*Primary Examiner* — Lisa M Caputo
*Assistant Examiner* — Jermaine Jenkins
(74) *Attorney, Agent, or Firm* — T. A. Dougherty, Esq.; J. A. Thurnau, Esq.; P. N. Dunlap, Esq.

(57) ABSTRACT

A snap-in tire pressure monitoring system having a valve that deforms to form an annular sealing surface around an opening in a tire rim. A sensor housing having electronics components configured to sense conditions within the tire may be attached to the valve. Data collected by the components may be wireless transmitted for further processing.

15 Claims, 6 Drawing Sheets

SNAP-IN TIRE VALVE

BACKGROUND OF THE INVENTION

Technical Field

The present invention relates to snap-in tire valves of the type that can be press-fit within an opening in a tire rim.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
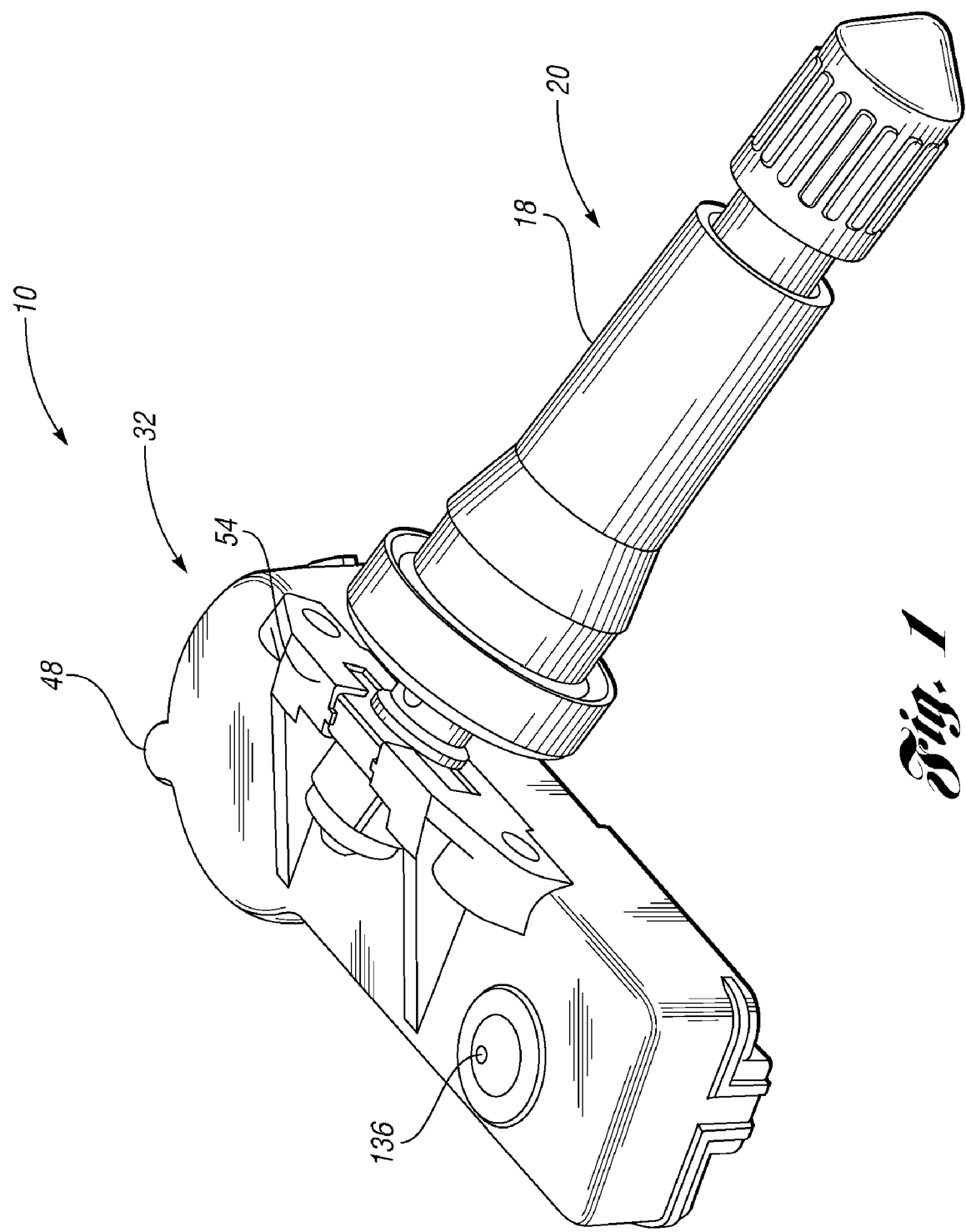
FIG. 1 illustrates a snap-in tire valve having a threaded fastener in accordance with one non-limiting aspect of the present invention.

FIG. 1 illustrates a snap-in tire pressure monitoring system 10 in accordance with one non-limiting aspect of the present invention. The TPMS 10 may be used to controllably regulate air pressure within a tire (not shown). As shown in the cross-sectional view of FIG. 2, the TPMS 10 may be press-fit within an opening 12 of a tire rim 14. An outer portion 18 of a valve 20 may be comprised of a resilient material that allows the valve 20 to 'snap-in' the opening 12. The resilient material may be a rubber or any other material having properties sufficient to forming an annular sealing surface 13 around the opening 12 that maintains air pressure within the tire.

The air pressure within the tire may be regulated with a valve core 22. The valve 22 core may include a reciprocating valve 24 that moves inwardly to admit or release air and that moves outwardly to seal the tire. The valve core 22 may be threaded within a rigid, inner portion 26 of the valve 20. The inner portion 26 may be used to define an air passageway 28 between an inboard end (inside tire) and an outboard end (outside tire) of the valve 20. The valve core 22 may be use to controllable regulate air flow through the passageway 28. A valve cap 30 may be attached to the valve 20 to protect the valve core 22 from contaminates and other debris.

Figure 3:
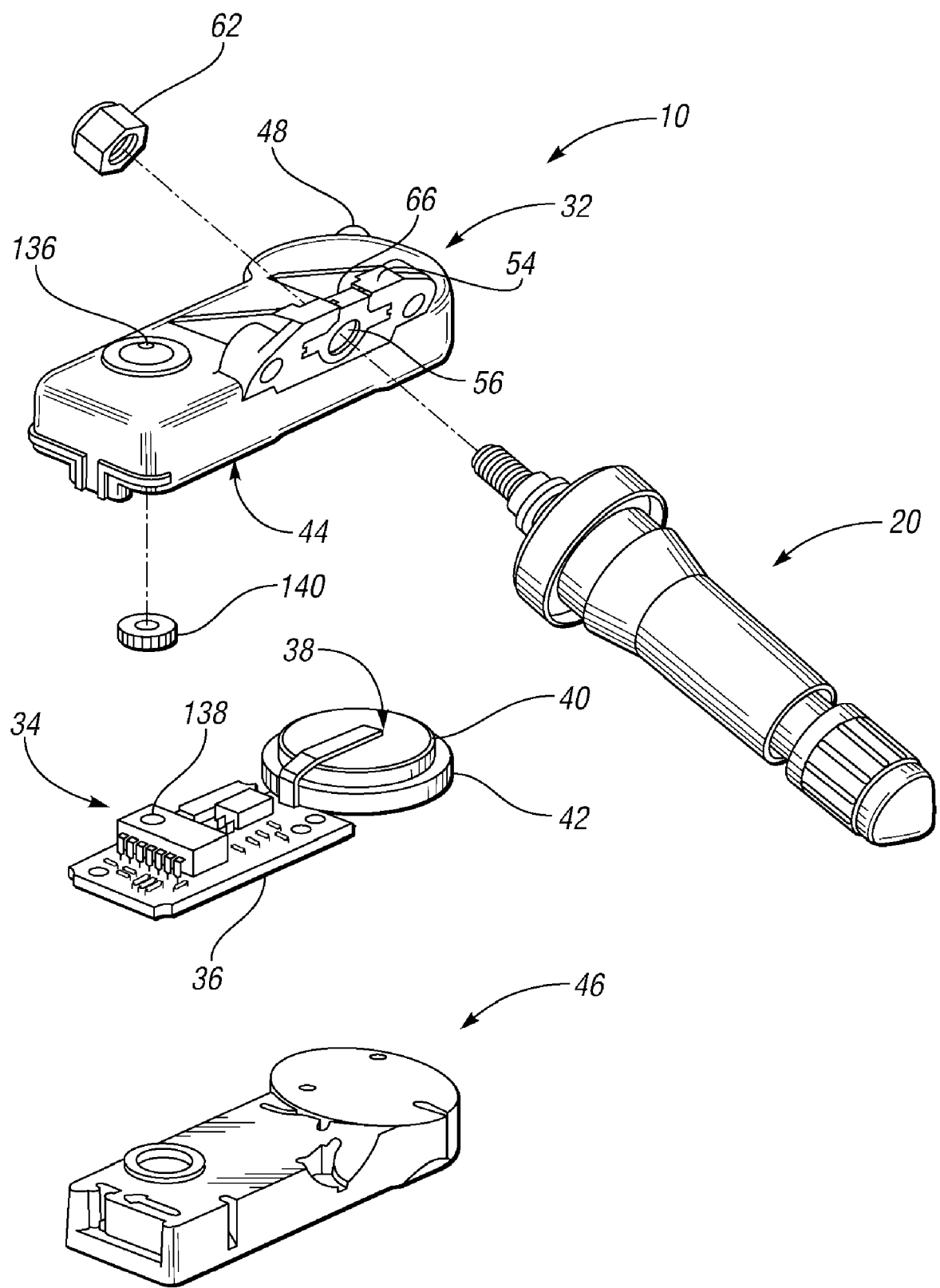
FIG. 3 illustrates an exploded view of the tire valve.

The valve 20 may be attached a sensor housing 32. The sensor housing 32 may include electronics 34 that measure conditions within the tire. The electronics 34 may be mounted on a printed circuit board (PCB) 36 and configured to measure any number of conditions within the tire, such as but not limited to tire pressure, rotation speed, and/or temperature. FIG. 3 illustrates some of the electronics 34 and the PCB 36, which may be powered with a battery 38. The battery 38 may be a multi-level battery having concentric, circular portions with a top portion 40 being smaller than a bottom portion 42.

The sensor housing 32 may include an open bottom side 44 through which the electronics 34, PCB 36, and battery 38 can be inserted.

The open sensor housing 32 may be filled with a potting material 46 to protect the components 34, 36, and 38 from contaminates. The electronics 34 may be pre-fabricated onto the PCB 36 and then positioned within the housing 32. The potting material may then be poured in a semi-liquid state into the housing 32. A nub or channel 48 may protrude from a perimeter of the housing 32 to channel the flowing potting material to a top side 50 above the battery 38. This can be helpful in assuring the electrical isolation of the battery poles. Optionally, the top portion 40 of the battery 38 may be the negative pole such that current flows through the battery in the direction of centrifugal force, which would point in an upward direction from the bottom 44 to the top 50 of the housing.

The top side 50 of the housing 32 may include an upwardly projecting connection portion 54, referred to as a bracket 54. The bracket 54 may include an opening 56 through which the inner portion 26 of the valve 20 may extend to be connected to the sensor housing 32. This inboard end of the valve 20 may have a solid cross-section. The solid cross-section may provide structural support for at threaded, fastening portion 58 and a shoulder 60 that cooperate with a threaded fastener 62 to secure the valve 20 to the sensor housing 32. The air passageway 28 may end before the solid portion at a cross-hole 64. The cross-hole 64 may exchange air between the inboard and outboard sides of the tire. The cross-hole 64 may be drilled in the same direction as the centrifugal force. This can be helpful in allow debris and other particular to be expelled from the valve 20 when the tire rotates.

The inner valve body 26 may be comprised of an electrically conducting material. The illustrated body is entirely composed of brass but portions of the body may have different materials. For example, the solid, inboard end may be made of steel to improve strength and decrease the size of the threaded fastener 62. An electrical connector 66 may extend between the valve 20 and the PCB 36 and/or one or more of the electronics 34. The electrical connector 66 can be used to electrically connect the valve 20 with the electronics 34 and/or PCB 36, such as to support wireless data transmissions.

The electrical connector 66 is shown to wrap around a top side of the bracket 54. A first side 68 of the connector 66 may extend down a corresponding first side of the bracket 54 and down into the sensor housing 32 for connecting to the PCB 36. A second side 70 of the connector 66 may extend down a corresponding second side of the bracket 54. The connector 66 may be attached to the bracket 54 as part of an injection molding process used to create the housing 32 and/or after creation of the housing 32. The connector 66 may include wings 72, 74 on the outboard side to facilitate its orientation. The connector 66 may be recessed so that its second side 70 is flush with the second side of the bracket 54. The connector 66 may be a relative thin material that provides no structural support to the connection between the sensor housing 32 and the valve 20.

When the fastener 62 is tightened to the valve 20, the first side of the connector 68 may be compressed against the nut 62 and the second side 70 may be compressed against the shoulder 60 to provide multiple points of contact with the inner valve body 26. The multiple points of contact may be facilitated by molding walls 78 within the bracket opening 56 to be flush with or recessed below openings 80, 82 on the first and second sides 68, 70 of the connector 66. The openings 56, 80, 82 of the bracket 54 and connector 66 may be keyed with the inboard end of the valve body 26 to insure proper alignment of the cross-hole 64, such as by including flats 86, 88, 90, 92 on the valve body 26 and the openings 56, 80, 82.

Figure 4:
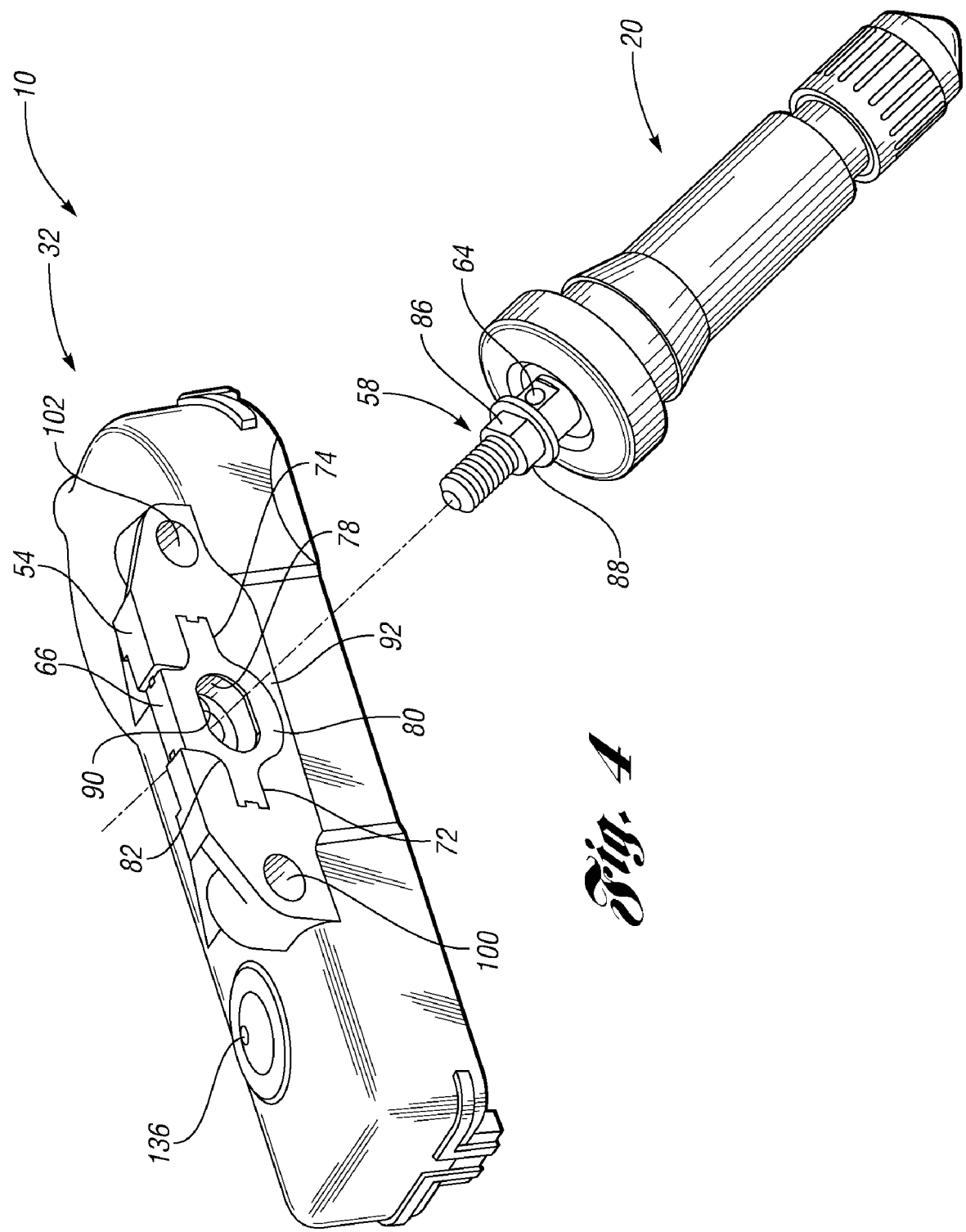
FIG. 4 illustrates assembly of a sensor portion and a valve portion of the tire valve.

Apertures 100, 102 may be included within the bracket 54 on opposite sides of the valve body 26. As shown in FIG. 4, the apertures 100, 102 can be used to orientate the bottom side 44 of the sensor housing 32 with a drop well 104 of the tire. The desire orientation may set an equal gap between the drop well 104 and left and right bottom edges 106, 108 of the housing 32. The left and right bottom edges 106, 108 may include feet 110, 112 that extend below the bottom side 44 to protect the potting material 46 should the TPMS 10 rotate. Guide rails (not shown) may extend through the apertures 100, 102 to facilitate guiding the TPMS 10 into the rim opening 12 in a manner that insures the desired orientation of the left and right bottom edges 106, 108.

Figure 5:
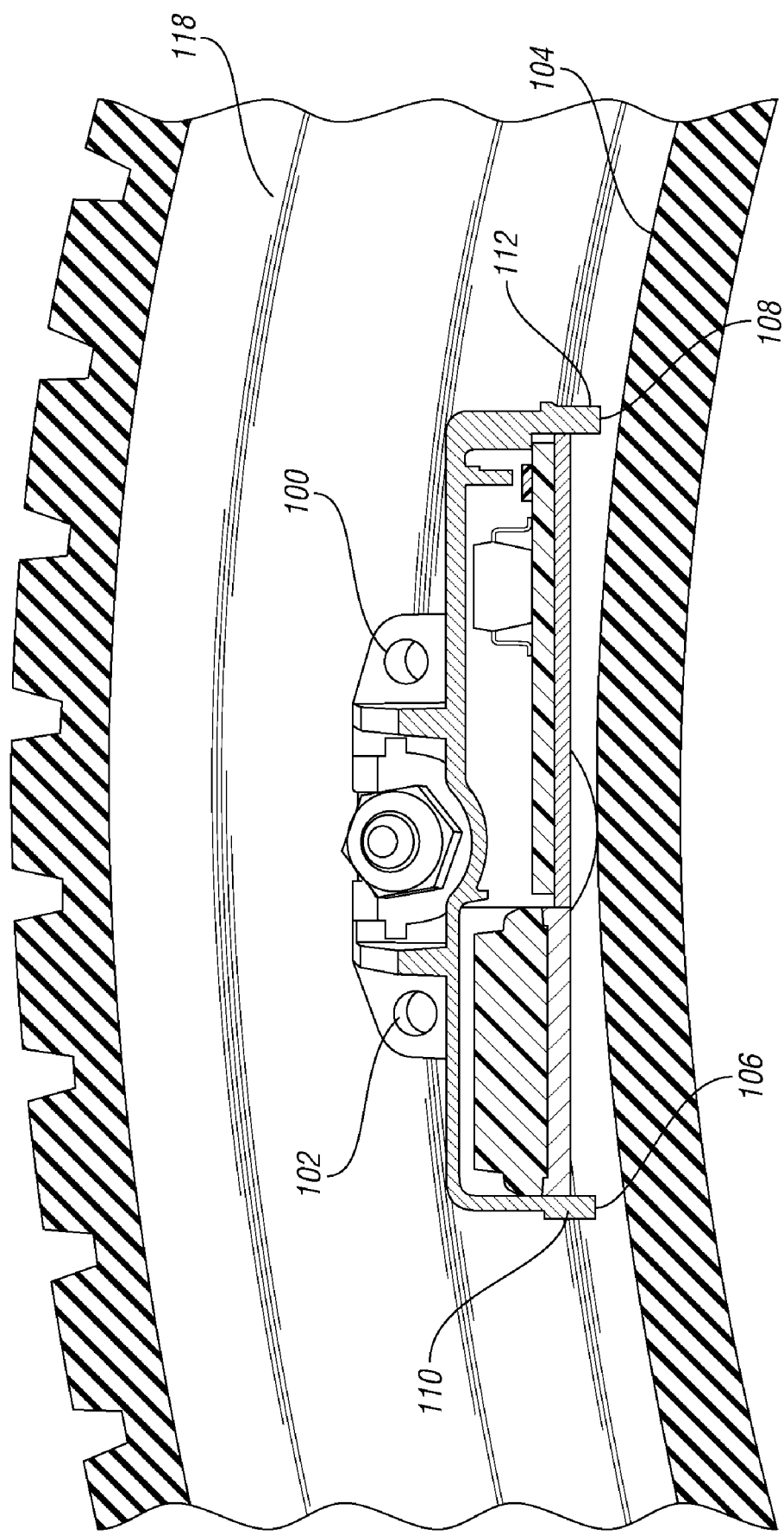
FIG. 5 illustrates an end view of the tire valve.

During assembly, the TPMS 10 may be positioned along the guide rails and pushed through the opening 12 from the inboard side of the tire rim 14. Optionally, a tool (not shown) may be attached to a threaded end 116 of the outboard portion of the valve body 26 to facilitate pulling the TPMS 10 through the opening 12. The insertion method may be less important than insuring the proper orientation of the left and right bottoms edges 106, 108. If one side is improperly aligned, a portion of the top side 50 or bracket 54 could rise above a bead hump 118 of the tire. This could cause a tire tread (not shown) to strike the housing 32 during attachment, possibly disrupting operation of the electronics 34. The sensor housing 32, valve 20, fastener 62 and other components may be sized and shaped into a package that sits below the bead hump 118, as shown in FIG. 5.

Figure 2:
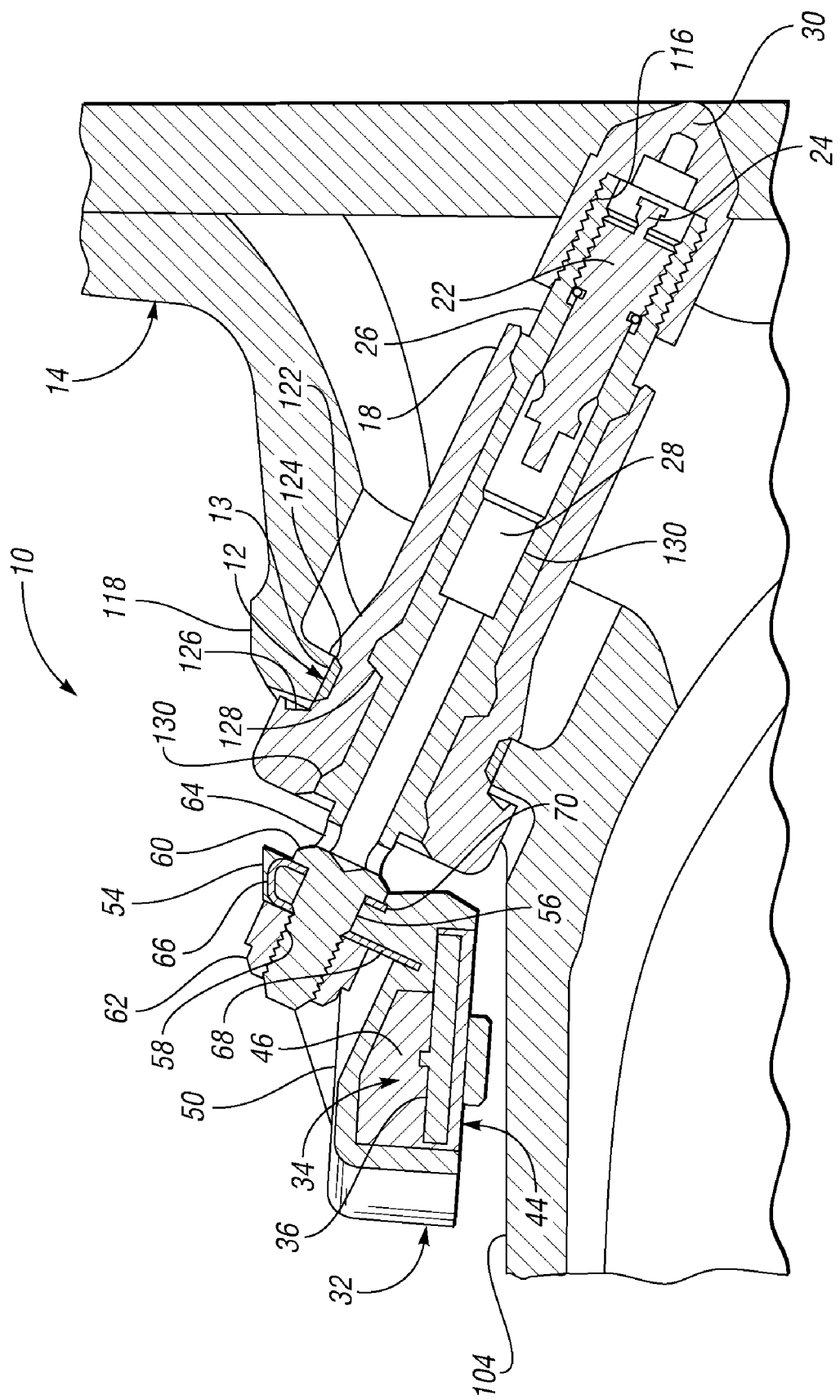
FIG. 2 illustrates a cross-sectional view of the tire valve shown.

The positioning of the sensor housing 32 below the bead hump 118 can be seen in FIG. 2. FIG. 2 also illustrates the annular sealing surface 13 used to seal the tire after the TPMS 10 is inserted. The resilient nature of the outer portion 18 causes it to move during insertion. An adhesive may be used to secure the outer portion 18 to the inner valve body 26. A ramp 122 may be included at the lead edge of the resilient element 18 in an effort to limit some of the related stress. This ramp 122 may provide a leading edge 124 that cooperates with a trailing edge 126 to facilitate sealing the annual surface. Stresses may still act on the lead and trailing edges 124, 126 after insertion.

Cylindrical features 128, 130 may be included on the valve body 26 relative inboard and/or outboard sides of the annular sealing surface 13 to help prevent the stresses on the leading and trailing edges 124, 126 from producing air leakage. A first one of the features 128 may extend away from a body portion 130 to provide a surface against which a portion of the resilient element 18 between the annular sealing surface 13 and the feature 128 is compressed when the seated valve 20 (as shown in FIG. 2) is pressed inboard. A second one of the features 130 may extend away from the body portion 130 to provide a surface against which a portion of the resilient element 18 between the annular sealing surface 13 and the feature 130 is compressed when the seated valve 20 is the pressed outboard. The engagement of the resilient element 18 against the surfaces 128, 130 resists the inboard/outboard movement. This can be helpful in preventing the centrifugal forces from raising the sensor housing 32 too far above the bead hump 118 during high speed rotation.

The proper positioning facilitate by the cylindrical portions 128, 130 can be helpful in assuring proper operation of the TPMS 10 and the monitoring it performs. As noted above with respect to FIG. 3, the proper orientation of sensor housing 32 may be useful to insure proper operation of the electronics 34, which may perform any number of operations. One particular operation contemplated by one non-limiting aspect of the present invention relates to sensing tire pressure and wireless transmitting the sensed value to another element within the vehicle (not shown). To facilitate the pressure measurement, the sensor housing 32 may include an aperture 136. A diaphragm or other pressure sensing element 138 may be positioned below the aperture 136 to facilitate the pressure measurement. A gasket 140 may be included to seal the inside of the sensor housing 32 from the exposed aperture 136.

As supported above, one non-limiting aspect to the present invention contemplates a TPMS 10 having a snap-in valve portion 26 and a removably attachable sensor portion 32. The attachment may be achieved with a nut 62 that threads directly to a rigid portion of a valve body 26. An air passageway 56 may end prior to a solid portion of the valve body 26 proximate the nut 62. Optionally, the passageway 56 may continue throughout an entire length of the rigid portion 36 to provide an opening at an end of the valve body 26 beyond the nut 62. Another optional feature may include attaching a sensor housing 32 with a clip or other fastener.

Figure 6:
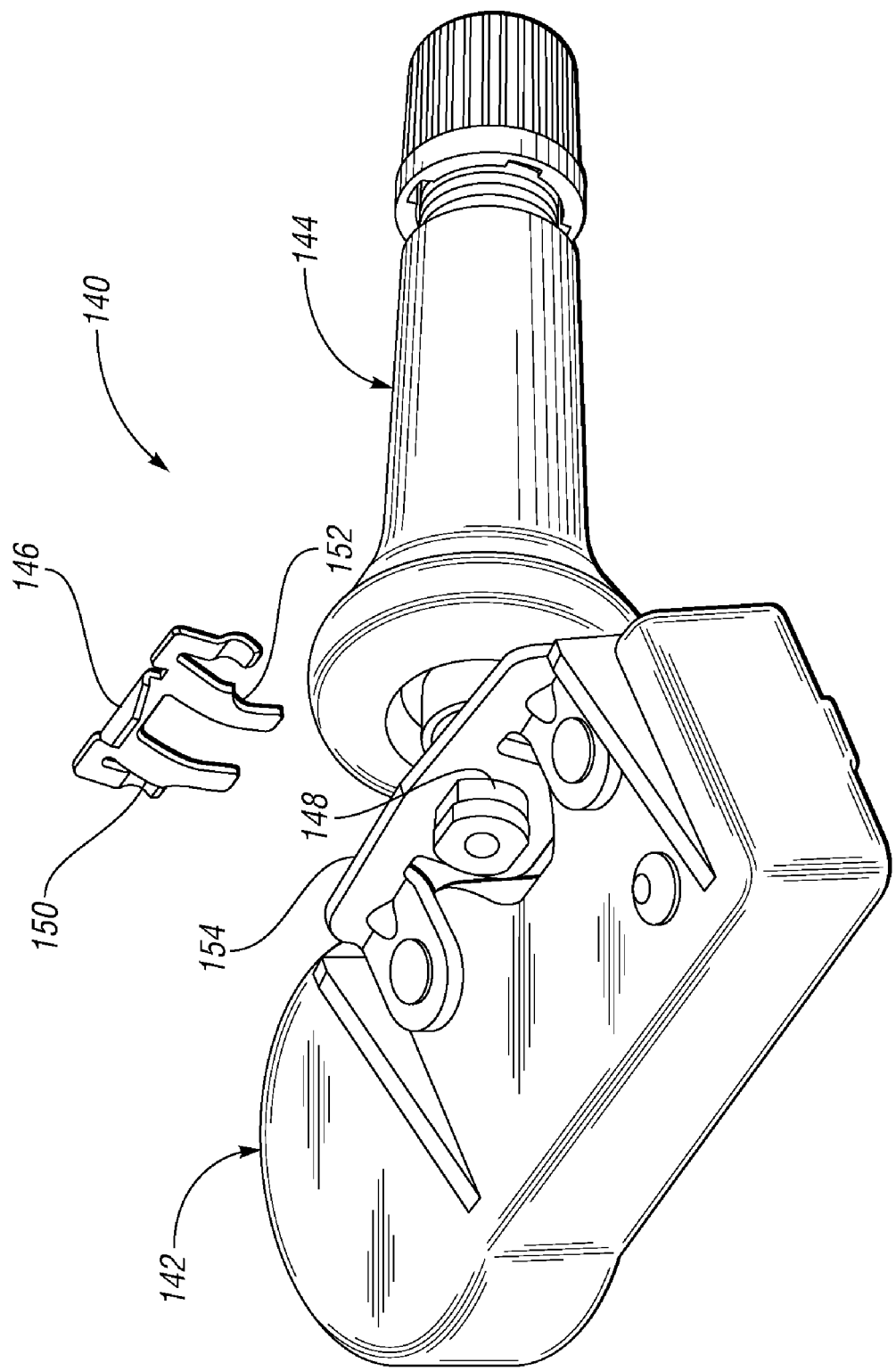
FIG. 6 illustrates a snap-in tire valve having a spring-clip in accordance with one non-limiting aspect of the present invention.

FIG. 6 illustrates a clip arrangement 140 for attaching a sensor housing 142 to a valve 144. A spring clip 146 may fit within a slot 148 to fasten the sensor housing 142 to the valve 144. The clip 146 may include arms 150, 152 that engage a bracket portion 154. The bracket portion 154 may be integral portion of the sensor housing 142, as described above, or a separate piece riveted to the housing 142, as shown in FIG. 5. The bracket 154 shown in FIG. 5 may be used in addition to or in place of the electrical connector 66 described above to electrically connect the electronics 34 with the valve body 26 so that the valve body 26 can be used as an antenna.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

What is claimed is:

1. A snap-in tire pressure monitoring system TPMS comprising:

a valve having an inner portion and an outer portion, the outer portion being a resilient element having a annular sealing surface configured to snap-in an opening in a tire wheel rim, the inner portion being a rigid element defining an air passageway between an inboard end and an outboard end;

a housing having electronics configured to sense parameters within the tire wheel rim;

an electrical connection element extending inside the housing to electrical connect with the electronics and outside the housing to electrically connect with the inboard end;

a fastener removable attached to the inboard end, the fastener providing a compressive force that compresses the electrical connection element against the inboard end; and the housing includes an upwardly extending connection portion through which the inner portion extends;

the connection element is u-shaped and fits over top of the connection portion, the electrical connection element having a first side that extends down a first side of the connection portion and a second side that extends down a second side of the connection portion;

the inner portion include a shoulder on the second side of the connection portion; and wherein the fastener compressively tightens the shoulder against the connection portion, causing the fastener to compress the first side of the connection element against the first side of the connection portion and to compress the second side of the electrical connection element against the second side of the connection portion.

2. The TPMS of claim 1 wherein the fastener is a threaded nut that threads to a threaded portion of the inboard end.

3. The TPMS of claim 2 wherein the threaded portion of the inboard end has a solid cross-section.

4. The TPMS of claim 3 wherein the threaded portion is comprised of a material different from the rest of the inner portion.

5. The TPMS of claim 1 wherein the fastener is a spring-clip that fits within grooves included on the inboard end.

6. The TPMS of claim 1 wherein a portion of the inboard end has a solid cross-section and includes a cross-hole to the air passageway, the cross-hole being located between the solid cross-section and an end of the resilient element.

7. The TPMS of claim 6 wherein the inner portion includes flats to key the inner portion to a connection portion of the housing.

8. The TPMS of claim 7 wherein the flats are perpendicular to a longitudinal axis of the cross-hole.

9. The TPMS of claim 1 wherein the inner portion includes a first cylindrical feature outboard of the annular sealing surface that extends outwardly from a body portion defining the air passageway, the first cylindrical feature providing an outwardly extending face against which a portion of the resilient element between the annual sealing surface and the first cylindrical feature engages to resist inboard movement.

10. The TPMS of claim 9 wherein the inner portion includes a second cylindrical feature inboard of the annular sealing surface that extends outwardly from the body portion, the second cylindrical feature providing an outwardly extending face against which a portion of the resilient element between the annual sealing surface and the second cylindrical feature engages to resist outboard movement.

11. The TPMS of claim 1 wherein the housing includes an open bottom side and a potting material that fills the housing to protect the electronics, wherein the housing further includes a channel along an outer perimeter that projects outwardly from the outer perimeter and extends from the open bottom side to a top side above a battery, the channel being filled with the potting material.

12. A snap-in tire pressure monitoring system TPMS comprising:

a valve having an inner portion and an outer portion, the outer portion being a resilient element having a annular sealing surface configured to snap-in an opening in a tire wheel rim, the inner portion being a rigid element defining an air passageway between an inboard end and an outboard end, the inboard end having a fastener portion and a shoulder;

a housing having electronics configured to sense parameters within the tire wheel rim, the housing having an upwardly extending connection portion with an opening through which the inner portion extends, the fastener portion being positioned on a first side of the connection portion and the shoulder being positioned on an opposite, second side of the connection portion;

a fastener that fastens to the fastener portion to secure the housing to the valve;

an electrical connection element extending inside the housing to electrical connect with the electronics and outside the housing to electrically connect with the inboard end;

the electrical connection element being u-shaped and fitting over top of the upwardly extending connection portion, the electrical connection element having a first side that extends down a first side of the upwardly extending connection portion and a second side that extends down a second side of the upwardly extending connection portion; and wherein the fastener compressively tightens the shoulder against the upwardly extending connection portion, causing the fastener to compress the first side of the electrical connection element against the first side of the upwardly extending connection portion and to compress the second side of the electrical connection element against the second side of the upwardly extending connection portion.

13. The TPMS of claim 12 wherein the fastener is a threaded nut.

14. A snap-in tire valve comprising:

an inner portion and an outer portion, the outer portion being a resilient element having a annular sealing surface configured to snap-in an opening in a tire wheel rim, the inner portion being a rigid element defining an air passageway between an inboard end and an outboard end, the inner portion having a first cylindrical feature outboard of the annular sealing surface that extends outwardly from the air passageway, the first cylindrical feature providing an outwardly extending face against which a portion of the resilient element between the annual sealing surface and the first clindrical feature engages to resist inboard movement;

a housing having electronics configured to sense parameters within the tire wheel rim, the housing having an upwardly extending connection portion with an opening through which the inner portion extends, the fastener portion being positioned on a first side of the upwardly extending connection portion and the shoulder being positioned on an opposite, second side of the connection portion;

a fastener that fastens to the fastener portion to secure the housing to the valve;

an electrical connection element extending inside the housing to electrical connect with the electronics and outside the housing to electrically connect with the inboard end;

the electrical connection element being u-shaped and fitting over top of the upwardly extending connection portion, the electrical connection element having a first side that extends down a first side of the upwardly extending connection portion and a second side that extends down a second side of the upwardly extending connection portion; and wherein the fastener compressively tightens the shoulder against the upwardly extending connection portion, causing the fastener to compress the first side of the electrical connection element against the first side of the upwardly extending connection portion and to compress the second side of the electrical connection element against the second side of the upwardly extending connection portion.

15. The valve of claim 14 wherein the inner portion includes a second cylindrical feature inboard of the annular sealing surface that extends outwardly, the second cylindrical feature providing an outwardly extending face against which a portion of the resilient element between the annual sealing surface and the second cylindrical feature engages to resist outboard movement.

* * * * *